W. F. FOLMER.
FOCUSING ATTACHMENT FOR CAMERAS.
APPLICATION FILED APR. 24, 1907.
911,001.
Patented Jan. 26, 1909.
3 SHEETS—SHEET 1.
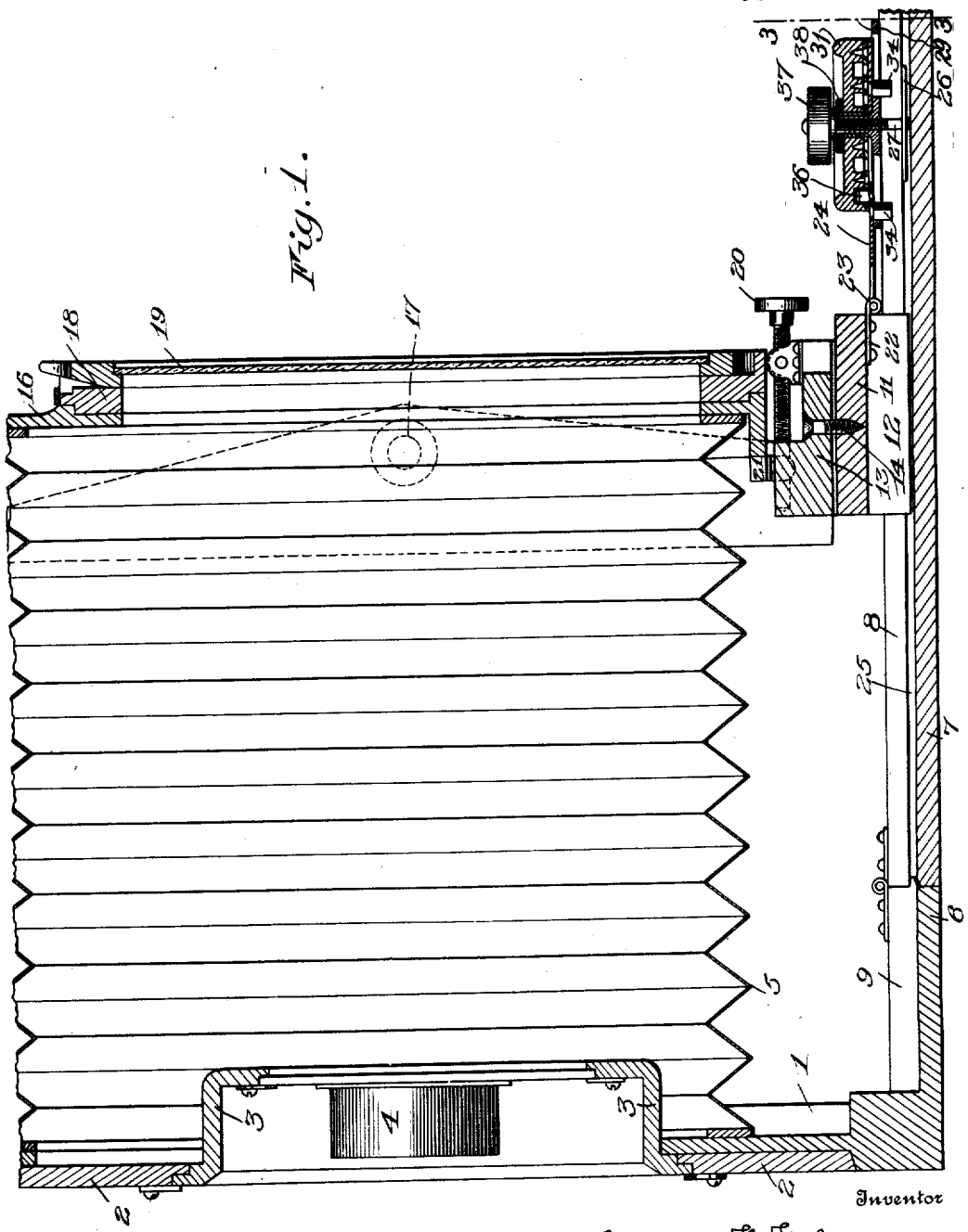
Witnesses
Walter B Payne
Russell B Griffith
Inventor
William F. Folmer
By Church & Rich
his Attorneys

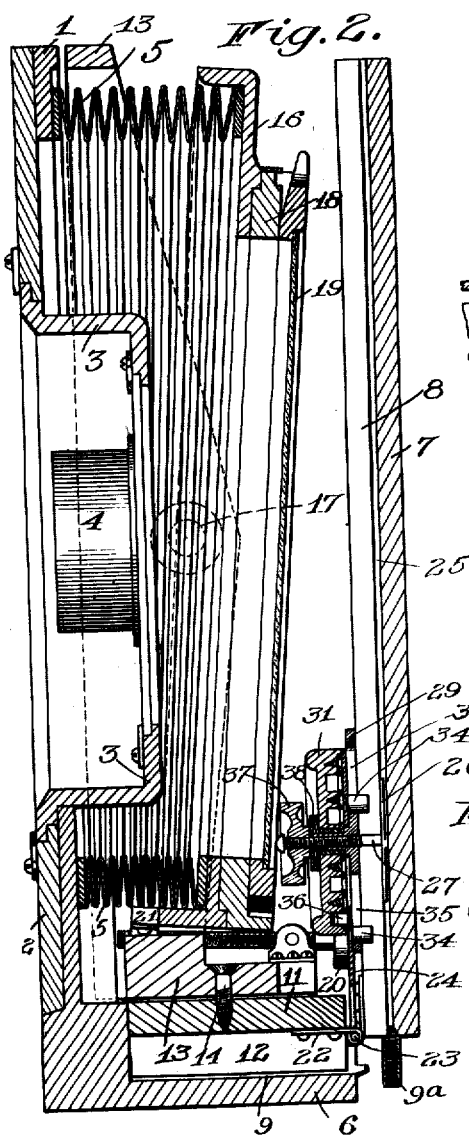
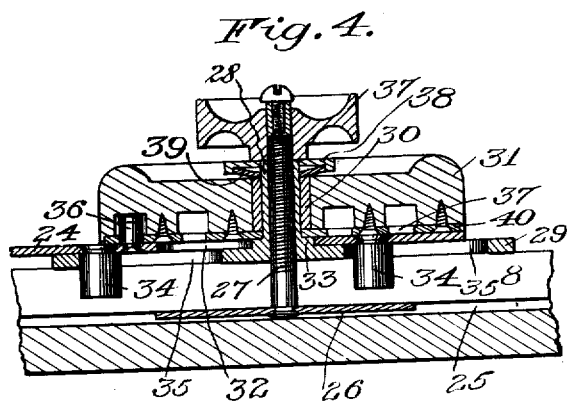
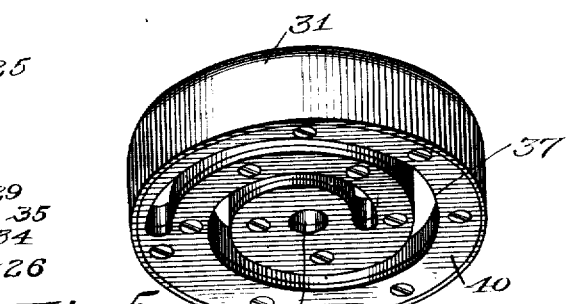
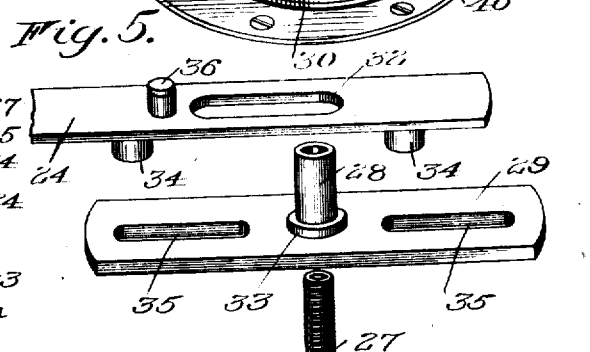

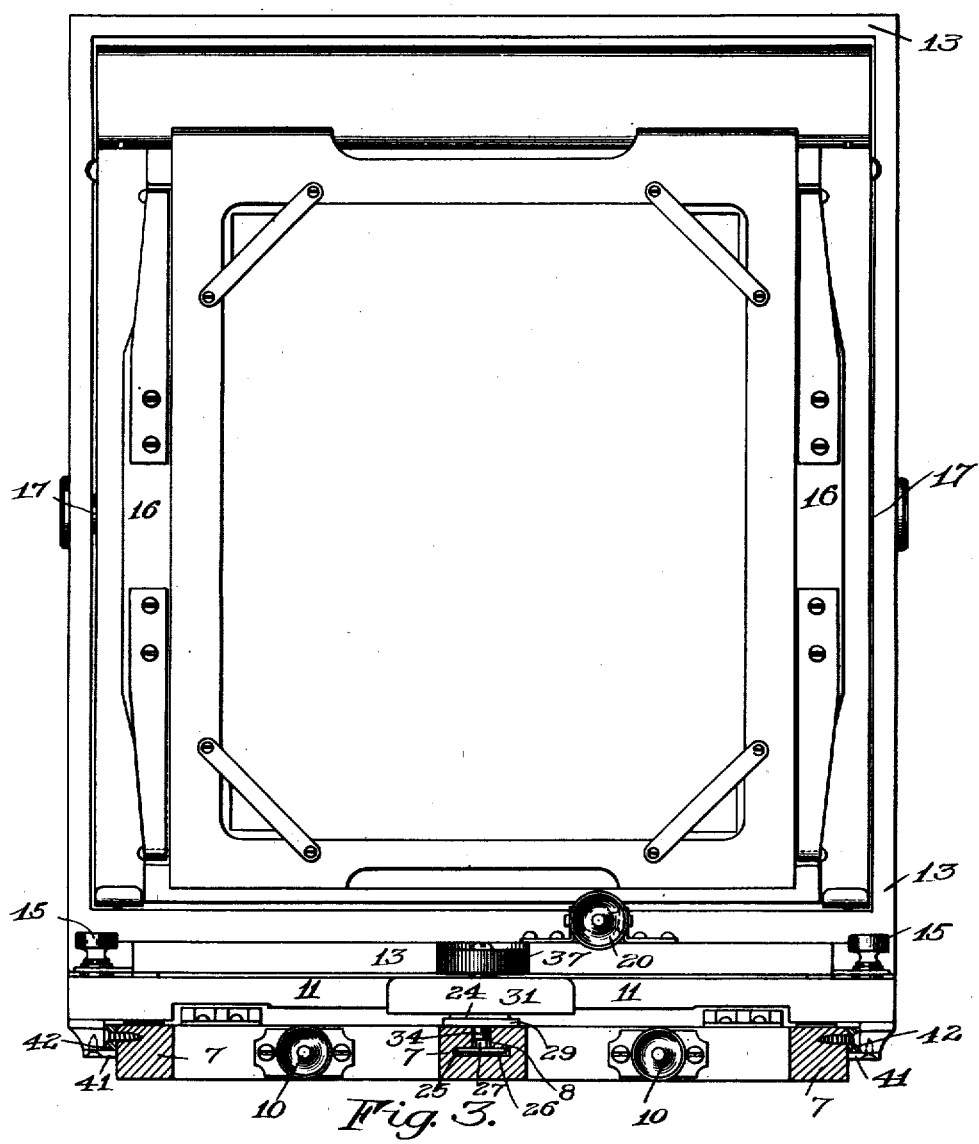

UNITED STATES PATENT OFFICE.

WILLIAM F. FOLMER, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

FOCUSING ATTACHMENT FOR CAMERAS.

No. 911,001.

Specification of Letters Patent.

Patented Jan. 26, 1909.

Application filed April 24, 1907. Serial No. 369,903.

*To all whom it may concern:*

Be it known that I, WILLIAM F. FOLMER, of Rochester, in the county of Monroe and State of New York, have invented certain new and useful Improvements in Focusing Attachments for Cameras; and I do hereby declare the following to be a full, clear, and exact description of the same, reference being had to the accompanying drawings, forming a part of the specification, and to the reference-numerals marked thereon.

My present invention relates to photographic cameras and particularly to the type employing a focusing screen and lens support, movable relatively to one another to permit the proper focus of the object to be determined by an inspection of the reflected image, and it has for its object to provide an attachment in connection with that one of the above members which is movable upon the base or support, by means of which it may be first positioned generally with reference thereto, and secured and then brought to a very fine state of adjustment by the use of accurately controlled means operating through a limited radius.

A further object of my invention is to adapt a device of this kind to folding cameras and to form an improved arrangement whereby the several movable and stationary parts are conveniently connected and disposed to such advantage as to be compact and yet readily accessible.

To these and other ends the invention consists in certain improvements and combinations of parts all as will be hereinafter more fully explained, the novel features being pointed out in the claims at the end of the specification.

In the drawings: Figure 1 is a central longitudinal sectional view of a folding camera embodying my improvements, shown in extended position. Fig. 2, is a similar view of the camera when folded. Fig. 3, is a rear elevation with the extended bed shown in section on the line 3—3 of Fig. 1. Fig. 4, is a central vertical section of the adjusting mechanism and adjacent parts taken longitudinally through the bed, and Fig. 5, is a collective view showing in perspective the several major parts of the same mechanism in their relative positions for assembling.

Referring to the drawings, 1 indicates the main frame or body portion of the camera having a front 2, within which is fitted a preferably removable breast 3, supporting the lens mount 4 and to which body is attached one end of the bellows 5. Hinged to the rear edge of the bottom portion 6 of the main frame, is an extension bed 7 provided with a central groove 8, in alinement and communicating with a similar groove 9 in the bottom piece forming a continuous guideway when the bed is extended as shown in Fig. 1. The bed is held rigidly in this extended position by bolts $9^a$, which are secured in the inner end of the bed and threaded into sockets in the bottom piece, being operated by the knurled heads 10 (Figs. 2 and 3).

Operating longitudinally of the bed is a movable carriage 11 provided with a rib or tongue 12 coöperating with the guideway, which carriage supports a frame 13 carrying the focusing screen and attachments and the holder for the sensitized material. Besides the guiding member 12, it is also provided with hooked projections 41 coöperating with strips 42, projecting laterally at both sides of the bed to prevent its disengagement from the latter through any cause. The frame 13 is pivoted to the carriage centrally at 14 and movable, for the usual purposes, in a horizontal plane into various positions of adjustment, where it is retained by bolts 15 (Fig. 3). The frame supports a supplemental frame 16 pivoted at 17 to which supplemental frame is attached retaining devices 18 for the sensitized materials and ground glass plate 19. The adjustment of the latter in a vertical plane is secured by means of a lead screw 20 mounted on the frame 13 and threaded into a projection 21 on the supplemental frame. It will be seen from what has been described, that when the camera is in folded position, the carriage 11 rests entirely upon the bottom-piece 9, the bellows being collapsed; the frame 13 is adjacent the lens mount and the extension bed loosened by means of the disengaging of the bolts 9, is folded up in a vertical plane in rear of the carriage and its attachments, as shown clearly in Fig. 2.

Attached in any suitable manner to the rear of the carriage 11 is the leaf 22 of a hinge connection 23, the other leaf of which is extended to form a tongue 24 which normally extends rearwardly parallel with the surface of the bed and will be hereinafter referred to.

The bottom of the groove 8 in the bed 7 is extended laterally on both sides to form a T-slot 25, (Fig. 3) within which slides freely a friction plate or shoe 26 to which is preferably rigidly attached a threaded bolt 27, extending vertically through the groove 8 and through a sleeve 28 on a friction plate 29, sliding upon the upper surface of the bed. Rotatably mounted on the sleeve 28 by means of a bushing 30, is an operating disc or knob 31, and interposed between this knob and the friction plate 29 is the tongue 24, previously referred to, provided with a slot 32 to allow its longitudinal movement on a collar or enlarged portion 33 at the base of the sleeve 28, the collar being of sufficient height or thickness to prevent the tongue from being tightly engaged by the opposed surfaces of the knob and friction plate. The tongue 24 is prevented from rotary or lateral movement by being provided with two downwardly projecting studs or pins 34 which enter the groove 8 and also pass through longitudinal slots 35 in the friction plate, preventing similar movement on the part of the latter, while upon the upper surface of the tongue adjacent the slot 32 is a stud 36 that coöperates with a cam formed by the spiral groove 37 in the knob or handle 31. The sleeve 28 projects to or beyond the upper surface of the handle 31 and the bolt 27 projects beyond the sleeve to receive the threaded thumb nut 37, which, when tightened, abuts the end of the sleeve and clamps the projecting portions of the bed between the shoe or plate 26 and the friction plate 29, as will be readily understood. The upwardly-projecting end of the sleeve 28 is encircled by a washer 38 bearing against a spring washer 39 interposed between said plate and the bushing 30, or against the upper surface of the knob or handle so that when the thumb nut 37 is tightened, sufficient yielding pressure is exerted against the knob or handle to prevent too loose a movement thereof, the latter being held by the collar 33 from such contact with the tongue 24 as might otherwise tend to prevent the free movement thereof on the friction plate. It will be seen that when the carriage 11 is drawn toward the body portion of the camera, the pivotal center of the hinge 23 will be coincident with that of the connection between the body and the bed, so that as the latter is folded into a vertical position, it will carry the clamping devices just described, with it, rotating them to the position shown in Fig. 2 and forming a firm and compact arrangement of the parts when so disposed.

The operation of the device is as follows: The bed 7 is first extended and secured as previously described, bringing the slots 8 and 9 in alinement and in substantial continuation, permitting the operator to grasp the knob or handle 31 and draw the carriage 11, supporting the focusing screen or plate, rearwardly and slide it freely into an approximate focus which he determines by an inspection of the image on the screen, the thumb nut 37 being loosened to allow the freedom of movement required. When this position has been attained, the thumb nut is tightened, clamping the portions of the bed adjacent the slot 8 firmly between the shoe 26 and the friction plate 29 and exerting a slight binding pressure on the knob 31 by reason of the action of the spring washer 39. The slight resistance thus offered to the movement of the knob prevents it from responding to accidental contacts, at the same time steadying its travel under the hands of the operator. It will be seen that when it is thereafter rotated the stud 36 on the tongue 24 will be forced to follow in the spiral slot 37, which gradually approaches the center of rotation and the tongue 24 will consequently move longitudinally of the bed between the knob and the friction plate, moving the carriage to which it is attached in the same direction. Through all these movements the bolt 27 is held against rotation by the shoe 26, and the friction plate 29 and the tongue 24 are held in position by the studs 34 held closely in the slot 8. The cam slot 37 is a true spiral generated by a point traveling circularly and radially with a constant and uniform velocity, so that the stud 36 sliding therein, approaches or recedes from the center of rotary movement with uniform rectilinear movement.

For the sake of lightness and to afford an agreeable hold for the hand of the operator, the knob 31 is preferably made of wood or similar substance, in which case it is advisable to provide it on its under side with a facing 40 of metal or other slow wearing material, which prevents the constant friction of the stud 36 from changing the contour of the cam.

A camera constructed in accordance with my invention may be operated with the greatest facility, the knob 31 offering a convenient grasp whereby the movable focusing member may be quickly drawn to its approximate position on the bed and secured, instead of being slowly extended as in devices in which but a single adjusting mechanism is employed and that, necessarily, one giving a comparatively gradual advance. The focus may then be accurately determined and the definition of the image perfected by the fine adjustment afforded by the cam mechanism. The sensitiveness of this latter may, as is apparent, be developed to any desired degree by simply regulating the radial increase per revolution in the form of the slot.

I claim as my invention:

1. In a camera, the combination with a bed provided with a guideway, of a carriage movable on the bed, a sliding member operating in said guideway and connected to the carriage, an operating member on said sliding member comprising a rotary knob having its axis in the center of the guideway and forming a hand-hold for moving the carriage on the bed and means controlled by the rotation of said operating member for effecting adjustment of the carriage relatively to the slide.

2. In a camera, the combination with a body portion and a bed hinged to said body portion, of a carriage movable on the bed, an adjusting device mounted on the latter and a hinge connection between said adjusting device and the carriage, the axis of said hinge being movable to coincide with the axis of movement of the bed and body.

3. In a camera, the combination with a bed and a carriage movable thereon, of a member movable on the bed, and adjustably connected to the carriage, a member for operating said adjustably connected parts relatively and means for exerting a yielding pressure on said operating member to prevent its accidental movement.

4. In a camera, the combination with a bed and a carriage movable thereon, of a member movable on the bed and adjustably connected to the carriage, a member for operating said adjustably connected parts relatively, and means for securing the movable member to the bed and simultaneously exerting a yielding pressure on said operating member to prevent its accidental movement.

5. In a camera, the combination with a bed and a carriage movable thereon, of a rotary knob on the bed having a cam groove on its under side and a tongue on the carriage extending beneath the knob and having a projection thereon coöperating with the groove and concealed beneath the knob.

6. In a camera, the combination with a bed and a carriage movable thereon and provided with a projection, of a rotary member on the bed and a spiral cam on said rotary member coöperating with the projection on the carriage for adjusting the latter on the bed.

7. In a camera, the combination with a bed and a carriage movable thereon and provided with a projection, of a rotary member on the bed and a spiral cam on said rotary member coöperating with the projection on the carriage for adjusting the latter on the bed, said cam being formed by a spiral slot or groove of the form generated by a point traveling at a constant and uniform velocity radially and circumferentially of the axis of the rotary member.

8. In a camera, the combination with a bed having a channel therein and a carriage movable thereon, of friction plates movable on opposite sides of a portion of said bed, one of said plates being provided with a slot and having a rotary member mounted thereon, a tongue on the carriage coöperating with the rotary member to adjust the carriage on the bed and a projection on the tongue extending through the slot in the friction plate and within the channel in the bed.

9. In a camera, the combination with a bed and a carriage movable thereon, of friction plates movable on opposite sides of a portion of said bed, a projecting sleeve on one of said plates and a threaded bolt secured to the other and extending through the sleeve, a tongue on the carriage, a rotary member on the sleeve coöperating with the tongue to move the latter longitudinally of the bed and a threaded nut on the bolt engaging the sleeve to clamp the friction plates to the bed.

10. In a camera, the combination with a bed and a carriage movable thereon and provided with a tongue having a slot therein, of friction plates movable on opposite sides of the bed, a projecting sleeve on one side of one of said plates having an enlarged portion located in the slot in the tongue and a threaded bolt secured to the other plate and extending through said sleeve, a rotary member on the sleeve abutting the enlarged portion thereof and coöperating with the tongue to move the latter longitudinally of the bed and a threaded nut on the bolt engaging the sleeve to clamp the friction plates to the bed.

11. In a camera, the combination with a bed and a carriage movable thereon, of friction plates on opposite sides of a portion of said bed, a projecting sleeve on one of said plates and a threaded bolt secured to the other and extending through the sleeve, a rotary member on the sleeve coöperating with the carriage to move the latter longitudinally of the bed, a threaded nut on the bolt engaging the sleeve to clamp the friction plates on the bed and a yielding member interposed between the nut and rotary member to exert a yielding pressure on the latter when the nut is tightened.

12. In a camera, the combination with a bed having a guideway and a carriage movable on the bed, of friction plates arranged to bear upon opposite sides of a portion of the bed, means for clamping the plates to the bed, a rotary member mounted upon one of the plates, an adjustable connection between the rotary member and the carriage and a projection on said connecting member engaging the said last mentioned plate and operating in the guideway.

13. In a camera, the combination with a bed provided with a guideway, of a carriage movable on the bed, a sliding member operating in the guideway and adjustably connected to the carriage, means including a rotary operating member for adjusting the carriage relatively to the slide and means for locking the slide upon the bed including a rotary operating member having its axis of rotation coincident with the axis of the operating member for the carriage adjusting means.

14. In a camera, the combination with a bed provided with a guideway, of a carriage movable on the bed, a sliding member operating in the guideway and adjustably connected to the carriage, a clamping bolt engaging one side of a portion of the bed, a member mounted on the bolt and adapted to exert a clamping pressure on the opposite side of the bed and means for adjusting the carriage relatively to the slide embodying an operating member rotatable about the bolt as an axis.

WILLIAM F. FOLMER.

Witnesses:
 RUSSELL B. GRIFFITH,
 C. KETCHUM.